United States Patent [19]
Pan et al.

[11] Patent Number: 5,777,009
[45] Date of Patent: Jul. 7, 1998

[54] FLAME RETARDANT LOW TG POLYESTERCARBONATE

[75] Inventors: Wie-Hin Pan, Evansville, Ind.; Dwight J. Patterson, Murfreesboro, Tenn.; Omar M. Boutni, Haslettt, Mich.; Luca P. Fontana, Evansville, Ind.

[73] Assignee: General Electric Company, Pittsfield, Mass.

[21] Appl. No.: 738,213

[22] Filed: Oct. 25, 1996

[51] Int. Cl.$^6$ ............................................. C08J 5/42
[52] U.S. Cl. ...................... 524/164; 524/165; 524/611; 524/612; 525/146
[58] Field of Search .......................... 524/164, 165, 524/611, 612; 525/146

[56] References Cited

U.S. PATENT DOCUMENTS

| | | | |
|---|---|---|---|
| 3,448,046 | 6/1969 | Schalin | 524/164 |
| 4,454,275 | 6/1984 | Rosenquist | 524/164 |

*Primary Examiner*—Terressa Mosley

[57] ABSTRACT

A polyestercarbonate copolymer blend which exhibits a glass transition temperature lower than bisphenol-A carbonate homopolymer, shows improved processability and fire-retardancy. The desired lower Tg and improved flow can be achieved by the polycondensation of a dihydric phenol and aliphatic dicarboxylic acid. The condensate is polymerized with a carbonate forming reagent. The resin is fire-retarded with a mixture of halogenated polycarbonate, potassium diphenylsulfone sulfonate and polytetrafluoroethylene.

11 Claims, No Drawings

FLAME RETARDANT LOW TG POLYESTERCARBONATE

BACKGROUND OF THE INVENTION

1. Field of The Invention

The invention relates to thermoplastic resin compositions and more particularly relates to improved fire retardant copolyestercarbonate resin compositions.

2. Brief Description of The Prior Art

Aromatic copolyestercarbonate resins are a well known class of synthetic polymeric resins, generally prepared by the reaction of a dihydric phenol with a carbonate precursor in the presence of an ester precursor; see for example U.S. Pat. No. 3,169,121. Although such resins have been found to be thermoplastically moldable under a broad range of molding conditions, only select copolyester-carbonate resin compositions are useful for commercial molding operations. This is due to the requirements of processability for a thermoplastic resin related to their melt flow behavior.

Furthermore, even though a given copolyester-carbonate resin may have the physical properties required for successful thermal molding, the product articles may be deficient in certain other physical properties otherwise desired. For example, the molded articles may lack a desired degree of impact strength, particularly at low temperatures.

Those skilled in the art have found that polyestercarbonate resins of a particular class exhibit a lowered glass transition (Tg) temperature and improved low temperature impact strengths.

Melt processable copolyestercarbonates having relatively high glass transition temperatures (on the order of 180° C. or more) are described in the U.S. Pat. No. 4,310,652 (DeBons et al., Jan. 12, 1982). The term "low glass transition temperature" or "reduced Tg" as used in the present invention means a Tg of less than 145° C.

Properties derived from low Tg polyester-carbonate make this material amenable to use in molding housings and components for business equipment and other applications. However, one of the requisites for these applications is flame retardation which the above polyestercarbonate resin does not intrinsically possess. We have now found that flame retardation can be imparted upon low Tg polycarbonates resins by adding a combination of particular fire retarding agents. The specific combination selected does not adversely affect other desired properties of the thermoplastic resin blend, such as melt stability.

SUMMARY OF THE INVENTION

The invention comprises a moldable thermoplastic blend of a copolyestercarbonate having a polymer backbone made up of recurring carbonate structural units of the formula:

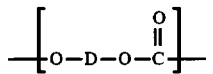
(I)

wherein D is a divalent aromatic radical residue of the dihydric phenol employed in the preparative polymerization reaction; and repeating or recurring carboxylic chain units of the formula:

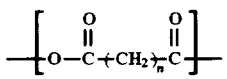
(II)

wherein n is a whole number integer of from 0 to 36, preferably 6 to 12; and a fire-retarding proportion of a mixture of:
(i) a halogenated polycarbonate resin;
(ii) potassium diphenylsulfone sulfonate; and
(iii) a drip-inhibiting proportion of polytetrafluoroethylene.

The invention also comprises articles thermally molded from compositions of the invention. The articles of the invention are useful as tool and instrument housings, automotive structural components and the like.

DETAILED DESCRIPTION OF THE PREFERRED EMBODIMENTS OF THE INVENTION

The polymer backbone structural units of the formula (I) described above are derived from dihydric phenols. Representative of dihydric phenols which may be employed in the preparation of the low Tg polyestercarbonate are those of the formula:

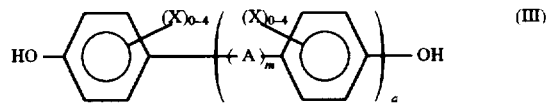
(III)

wherein A is a divalent hydrocarbon radical containing from 1 to about 15 carbon atoms; a substituted divalent hydrocarbon radical containing from 1 to about 15 carbon atoms and substituent groups such as halogen; —S—; —S—S—; —S(=O)—; —S(=O)$_2$—; —O—; or —C(=O)—; wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and a is an integer of from 0 to 5.

Typical of some of the dihydric phenol (III) that can be employed in the practice of the present invention are bisphenols such as (4-hydroxy-phenyl)methane, 2,2-bis(4-hydroxyphenyl)propane (also known as bisphenol-A), 2,2-bis(4-hydroxy-3,5-dibromophenyl)-propane; dihydric phenol ethers such as bis(4-hydroxyphenyl) ether, bis (3,5-dichloro-4-hydroxy-phenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxy-phenyl) sulfoxide and bis((3,5-dibromo-4-hydroxy-phenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

In the dihydric phenols employed, the reactive groups are the two phenolic hydroxyl groups.

The carboxylic chain units of the formula (II) given above are derived from aliphatic dicarboxylic acids or the corresponding salts (ester precursors) of the formula:

$$HOOC+CH_2)_{\overline{n}}COOH \quad (IV)$$

wherein n is as defined above, under conditions which yield an excess of chloroformate end-groups relative to phenolic or carboxylic acid moieties;

Representative of the dicarboxylic acids of the formula (IV) are oxalic, malonic, glutaric, adipic, succinic, suberic, sebacic, azelaic, undecanedioic, dodecanedioic dicarboxylic acids and the like and polymeric fatty acids. The polymeric fatty acids, sometimes referred to in the art as "dimer acids", are complex mixtures resulting from the polymerization of fatty acids. Representative of polymeric fatty acids are those commercially available from the polymerization of tall oil fatty acids. These polymeric fatty acids have a typical composition as follows:

|  | % BY WEIGHT |
|---|---|
| $C_{18}$ monobasic acids (monomer) | 0–5 |
| $C_{36}$ dibasic acids (dimer) | 60–95 |
| $C_{54}$ and higher polybasic acids (trimer) | 1–35 |

The relative ratios of monomer, dimer, and trimer in unfractionated polymeric fatty acids are dependent on the nature of the starting material and the conditions of polymerization. Methods for the polymerization of fatty acids are described, for example, in the U.S. Pat. No. 3,157,681. Methods of preparing these preferred acids are well known, and they are readily available commerically.

Preferred dicarboxylic acids employed in the invention are straight chain aliphatic diacids having at least 6 carbon atoms and more preferably 6 to 12 carbon atoms such as azelaic, sebacic and dodecanedioic acids.

The dicarboxylic acids of the formula (IV) given above are used as the free dicarboxylic acids (IV) or in the form of their reactive alkali metal derivatives or salts. The alkali metal salt of the dicarboxylic acid which can be employed in the polymerization process can be any of the alkali metal salts, selected from the groups consisting of the alkali group and the alkaline earth groups. Specifically, these include potassium, sodium, lithium, calcium, magnesium and like alkali metal salts of the dicarboxylic acids of formula (IV) given above.

Mixtures of these dicarboxylic acid salt derivatives may be employed. Therefore, where the term dicarboxylic acid is used herein it is to be understood that this term includes mixtures of two or more salts of the dicarboxylic acids of formula (IV).

In preparing the polyestercarbonates, there is a first step wherein the dihydric phenol or a mixture of dihydric phenol and an aliphatic dicarboxylic acid (IV) is phosgenated to form a pre-polymer reaction mixture containing the corresponding chloroformates together with various oligomers and unreacted starting materials. The phosgenation is advantageously carried out in the presence of an inert organic solvent. An inert solvent is one which does not enter into the esterification reaction or adversely affect the desired course of the phosgenation.

Representatives of such solvents include methylene chloride, 1,2-dichloroethane, chlorobenzene, toluene and the like.

The phosgenation of the dihydric phenol (III) in an inert solvent may also be carried out in the presence of the aliphatic dicarboxylic acid (IV) or salt described above. In fact, the phosgenation step may be carried out in a reaction mixture containing all the reactants for an interfacial polymerization to obtain a copolyestercarbonate resin, except that it should not contain an effective proportion for polymerization, of the polymerization catalyst or of any molecular weight regulator. Advantageously, the phosgenation reaction is carried out at a pH within the range of from 8 to 11, preferably 8.5 to 10.0, by addition of an aqueous alkali or alkaline earth metal solution. Representative of alkali and alkaline earth metal solutions are aqueous solutions of sodium and potassium hydroxide. The phosgenation reaction will therefore produce the oligomeric bischloroformate intermediates which subsequently react with the dicarboxylic acid moieties or any remaining phenolic species in the following polymerization reaction.

A tertiary amine may be present in the phosgenation reaction to produce the oligomeric bischloroformate intermediates, as an acid acceptor. However, it should not be present in a quantity which will function as a polymerization catalyst. In general, about 50 PPM of the reaction mixture is sufficient as an acid acceptor.

The phosgenation reaction proceeds advantageously at a temperature of from 0° to 100° C., preferably about reflux temperature for the reaction mixture. Since the reaction is exothermic, the rate of phosgene addition may be used to control the reaction temperature. The amount of phosgene required will generally depend upon the amount of polyfunctional organic reactant compounds present.

In the second step of the process, the reaction product of the phosgenation (Step 1) of the dihydric phenol (III) is subjected to polymerization with a carbonate forming reagent and a suitable molecular weight regulator.

If the aliphatic dicarboxylic acid was not added in the first step, it should be added prior to the addition of the carbonate forming reagent.

The prior art catalysts for promoting polymerizations are employed in catalytic proportions, see for example the catalysts and proportions described in U.S. Pat. No. 4,983,706, incorporated herein by reference thereto.

In general, an effective amount of polymerization catalyst is within the range of from about 0.75 to about 3.0 mole percent of the dihydric phenol (III) employed in Step 1.

The catalyst employed accelerates the rate of polymerization of the chloroformates with the carbonate forming reagent. Representative catalysts include but are not limited to the tertiary amines, phosphonium catalysts and the like. Triethylamine is a preferred catalyst.

The carbonate precursor can be either a carbonyl halide or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)-propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

A molecular weight regulator is necessarily added to the polymerization reaction, subsequent to phosgene depletion in Step 1 and prior to addition of the carbonate forming reagent. This serves to partially cap the bischloroformate intermediates, thereby limiting the overall weight average molecular weight of the polyestercarbonate product resin.

The molecular weight regulators which can be employed in the process include monohydric phenols such as phenol, chroman-I [4-(2,4,4-trimethyl-chromanyl)phenol], p-t-butyl phenol, 4-p-cumyl phenol and the like. Preferably, phenol or 4-p-cumyl phenol are employed as the molecular weight regulator. An effective amount of a molecular weight regulator that will give modified melt flow value (KI) of 1.000 to 50.000 centiseconds, preferably from 5.000 to 30.000 centiseconds may be used. Generally, it is preferred to use from 2–5 mol %, and more preferably from 2.5–4.5 mol % of the phenol used in Step 1 as the molecular weight regulator.

The temperature of the polymerization reaction is advantageously maintained within the range of from about 0° C. to 100° C., preferably 0° C. to about 50° C. advantageously, the polymerization is carried out at pH of from 10 to 12.5 by addition of an alkali solution.

The proportions of the other reactants employed to prepare the copolyestercarbonate resins will vary in accordance with the proposed use of the product resin. Those skilled in the art are aware of useful proportions, as described in the U.S. patents referred to above. In general, the amount of the ester may be from about 1 to about 45 mole percent, relative to the carbonate. For example, 6 moles of bisphenol A reacting completely with 4 moles of diacid would give a copolyestercarbonate of 40 mole percent ester.

Additional embodiments of the invention include blends of thermoplastic molding compositions containing minor proportions (less than 50 percent by weight) of polycarbonate homopolymers in admixture with the copolyestercarbonate resins of the invention.

Polycarbonate homopolymer resins and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; 4,188,314; 4,737,573; and 4,743,676, all of which are incorporated herein by reference thereto.

The resins prepared in accordance with the method of the invention may also be branched.

Branching of the resin results from the inclusion of a polyfunctional organic compound, which is a branching agent. The polyfunctional organic compound employed may be, for example, 1,1,1-tris-(4-hydroxyphenyl) ethane, trimellitic triacid or like agents. The branching agent is used to make branched aromatic copolyestercarbonates having an IV of about 0.3 to 1.0 dl/g as measured in methylene chloride at 25° C. These branched copolyestercarbonates are substantially free of crosslinking.

In the preparation of the branched copolyestercarbonates of this invention, the amount of the branching agent which is reacted with the dihydric phenol and the carbonate precursor is critical to the extent that the amount employed must be sufficient to produce a true thermoplastic randomly branched resin which is substantially free of crosslinking. If an amount of branching agent employed is less than 0.01 mole percent, based upon the moles of the dihydric phenol employed, the resulting polymer will not exhibit the degree of non-Newtonian melt characteristics desired for blow molding and/or melt extrusion purposes. Preferably, it is desirable to employ 0.01 to about 3.0 and more particularly 0.01–1.0 mole percent of the branching agent, based upon the total moles of dihydric phenol.

Thermoplastic compositions of the invention may also be compounded by mixing the copolyester-carbonate resins of the invention with conventional molding aids such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; impact modifiers and color stabilizers such as the organophosphites; thermal stabilizers such as phosphite; and mold release agents.

Flame retardancy is given to the thermoplastic blends of the invention by the addition of a flame-retarding proportion of a mixture of a halogenated polycarbonate resin, diphenylsulfone sulfonate and a drip-inhibiting proportion of a polytetrafluoro-ethylene (PTFE). Preferred as the halogenated polycarbonate resin is tetrabromobisphenol polycarbonate.

The tetrabromobisphenol polycarbonate can be any of the homopolycarbonates made from tetrabromobis-phenol-A and phosgene or the copolycarbonates made using partly tetrabromobisphenol-A and partly bisphenol-A. The halogenated homopolycarbonates are available for example from Great Lakes Chemical Corp. as BC-52 and BC-58: BC-52 is an oligomer of tetra-bromobisphenol A polycarbonate with phenoxy end groups on the chain; BC-58 is similar but with 2,4,6-tribromophenoxy end groups on the chain. The copolymers of tetrabromobisphenol A and bisphenol A are described and their preparation given by Womback in U.S. Pat. No. 3,915,926, incorporated herein by reference thereto. The preferred tetrabromo-bisphenol A polycarbonate is one having about 50% tetrabromobisphenol A and 50% bisphenol A units on a molar basis, commercially available as TB-50 from General Electric Company. The proportion of halogenated polycarbonate in the blends of the invention may be within the range of from 0.1 to 1.0 phr.

The fire retarding additive component which is potassium diphenylsulfone sulfonate is a well known compound, which may be prepared by the method described in U.S. Pat. No. 3,948,851 which is incorporated herein by reference thereto. In a preferred embodiment of the invention, the potassium diphenylsulfone sulfonate is first treated to remove contaminant acids. The term "contaminant acids" as used herein refers to free acid determined by a requirement for potassium hydroxide to neutralize the acidity of the compound. The method of determining acid concentration is described below.

Acidity Determination

Two grams of the compound to be analyzed is mixed with 75 ml. each of toluene and methanol in a 250 ml. Griffin beaker. The beaker is covered with a watch glass and the mixture refluxed for 5 minutes with stirring. The mixture is then allowed to cool to room temperature. Employing a Fisher Accumet pH meter with combination electrode, the mixture is titrated at a constant rate with 0.02N potassium hydroxide in methanol to a pH of 7.7. A standard blank is prepared by carrying a mixture of 75 ml. each of toluene and methanol through the same procedure, outlined above. The acid content of the compound is then calculated according to the equation;

$$\text{Percent acid} = (A - B) \times 0.0365$$

wherein A is the number of milliliters, of potassium hydroxide solution used to titrate the compound mixture and B is the number of milliliters of potassium hydroxide used to titrate the standard blank.

The number of equivalents of acid present in a given sample are determined by the formula:

$$\text{Equivalents acid} = \frac{(\text{Percent acid}) (\text{grams compound to be treated})}{36.5}$$

The contaminant acid may be removed from the potassium diphenylsulfone sulfonate by treating the potassium salt with from 0.01 to 1.5 epoxy equivalents per equivalent of acid to be removed, of a monomeric epoxide compound.

Treatment may be carried out by mixing the sulfonate with the epoxide at room temperatures (preferably at a temperature of from 60° F. to 300° F). Vigorous mixing for 15 to 30 minutes is advantageous. The treated potassium salt, scavenged of free acid, provide compositions of the invention with noticeable improvement in physical properties such as melt stability.

The term "epoxy equivalent" as used in the specification and claims means that weight of epoxide compound which contains an average of one epoxy group. The term "epoxy group" as used herein means the moiety of formula:

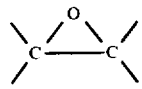

Preferably, the monomeric epoxide compound is characterized by having at least one epoxy group present in a substituent attached to a hydrocarbon; or by having two terminal epoxy groups separated by the residue of a polypxyalkylene glycol having a molecular weight of from about 100 to 700. Most preferably, the epoxide compound is characterized by having at least one epoxy group fused to a cycloaliphatic hydrocarbon ring.

Preferably, the monomeric epoxide compound employed is a mono or diepoxide.

The term "hydrocarbon" is used herein in its generally accepted sense as embracing aliphatic, cycloaliphatic and aromatic hydrocarbons. Illustrative of aliphatic hydrocarbons are those of 1 to 12 carbon atoms, inclusive, such as methane, ethane, propane, butane, pentane, hexane, heptane, octane, nonane, decane, undecane, dodecane and isomeric forms thereof. Illustrative of cycloaliphatic hydrocarbons are those of 6 to 12 carbon atoms, inclusive, such as cyclohexane, cycloheptane, cyclooctane, dicyclohexane, and the like. Illustrative of aromatic hydrocarbons are those having 6 to 12 carbon atoms, inclusive, such as benzene, naphthalene, biphenyl and the like.

Examples of monomeric epoxides having at least one epoxy group present in a substituent attached to a hydrocarbon are:

(1) The glycidyl ethers of aliphatic mono-hydroxy alcohols having 2 to 6 carbon atoms, inclusive such as ethanol, propanol, butanol, pentanol, hexanol, and isomeric forms thereof;

(2) Diglycidyl ethers of aliphatic diols having 2 to 6 carbon atoms, inclusive such as ethanediol, propanediol, butanediol, pentanediol, hexanediol and isomeric forms thereof;

(3) Glycidyl ethers of monohydroxy aromatic compounds such as phenol naphthol, xylol and the like;

(4) The glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene 1,7-dihydroxynaphthalene and the like;

(5) The glycidyl ethers of non-fused polynuclear phenols represented by the general formula:

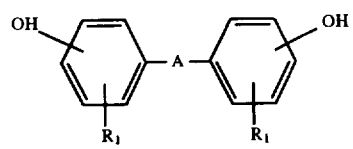

wherein $R_1$ represents from 0 to 4 substituents elected from the class consisting of halogen such as chlorine and bromine and lower-alkyl. A is a bridging group selected from the class consisting of

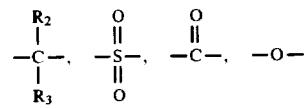

and a single covalent bond, wherein $R_2$ and $R_3$ each represent a moiety selected from the class consisting of hydrogen lower-alkyl, lower-cycloalkyl and aryl. Illustrative of such compounds are the bis(glycidyl ethers) of;
4,4'-dihydroxydiphenylsulfone.
4,4'-dihydroxydiphenyl.
4,4'-dihydroxybenzophenone.
di (4-hydroxyphenyl) methane (bisphenol F).
2,2-di(4-hydroxyphenyl)butane (bisphenol B).
2,2-di(4-hydroxyphenyl)propane (bisphenol A).
1,1-di(4-hydroxyphenyl)propane.
3,3-di(3-hydroxyphenyl)pentane.
2-(3-hydroxphenyl)-2-(4'-hydroxyphenyl)butane.
1-phenyl-1-(2-hydroxyphenyl)-1-(3'-hydroxyphenyl butane.
1-phenyl-1-(2-hydroxyphenyl)1-1(3'-hydroxyphenyl propane.
1-phenyl-1,1-di(4-hydroxyphenyl)butante.
1-phenyl-1,1-di(4-hydroxyphenyl)pentane.
1-tolyl-1,1-di(4-hydroxyphenyl)ethane.
bis(3-bromo-4-hydroxyphenyl)methane.
2,2-bis(3-bromo-4-hydroxyphenyl)propane.
bis(3-bromo-4-hydroxyphenyl)diphenylmethane.
1,1-bis(3-bromo-4-hydroxyphenyl)-1-(2,5-dibromophenyl ethane.
bis(3,5-bromo-4-hydroxyphenyl)methane.
2,2-bis(3,5-dibromo-4-hydroxyphenyl)propane.
bis(3,5-dibromo-4-hydroxyphenyl)diphenylmethane.
1,1-bis(3,5-dibromo-4-hydroxyphenyl)-1-(2,5 dibromophenyl) ethane.
bis(3-bromo-4-hydroxyphenyl)sulfone and
bis(3,5-dibromo-4-hydroxyphenyl)sulfone;

(6) The glycidyl ethers of novolak resins. The novola resins are the products obtained by acid condensation phenol, or a substituted phenol, with formaldehyde and conventionally represented by the general formula:

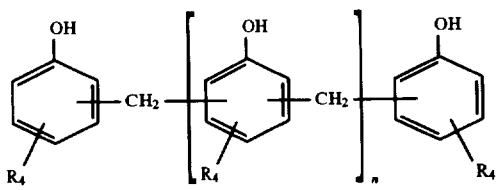

wherein n has an average value of from about 8 to 12 and I represents from 0 to 4 substituents selected from halog and lower alkyl groups. It is to be understood that the abo formula is highly idealized and is an approximation onl see, for example, Carswell, "phenoplasts," pp. 29–3 Interscience, New York. 1947. A wide range of novol resins of differing molecular weights is available commercially, all of which are represented approximately by the above formula. Since the class of novolak resins is so well recognized in the art, the epoxides derived therefrom by conversion of the novolaks to their glycidyl ethers (by conventional procedures, e.g., reaction with epichlorohydrin) will be referred to hereafter as "novolak resin slycidyl ethers."

Monomeric epoxide compounds characterized by having two terminal epoxy groups separated by the residue of a polyoxyalkylene glycol having a molecular weight of from about 100 to about 700 are well known. They are illustrated by diepoxides, of the formula:

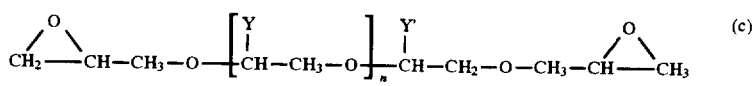

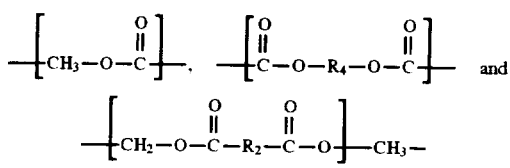

wherein $R_6$ is selected from the class consisting of lower alkylene and lower oxyalkylene and $R_7$ is selected from the class consisting of lower alkylene and arylene. Examples of the dicyclohexyl oxide carboxylates are:

wherein Y and Y' are each selected from the group consisting of hydrogen and methyl and n is an integer of from 1 to 10, inclusive. Representative of such diepoxides are those prepared by reaction of two moles of epichlorohydrin with one mole of a polyoxyalkylene glycol having a molecular weight of from about 100 to about 700. Polyoxyalkylene glycols are well known compounds as illustrated by polyoxyethylene glycol and polyoxypropylene glycol.

The most preferred epoxide compounds employed in the process of the invention are those wherein at least one epoxy group is fused to a cycloaliphatic hydrocarbon ring. Examples of such epoxides are: dicyclopentadiene dioxide; i.e. the compound having the formula:

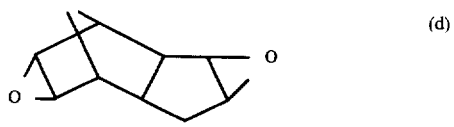

vinyl cyclohexene dioxide, i.e. the compound of formula:

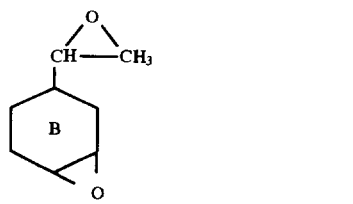

2-(3,4-epoxycyclohexyl-5-spiro-(3,4-epoxy) cyclo-hexane-m-dioxane; i.e. the compound having the formula:

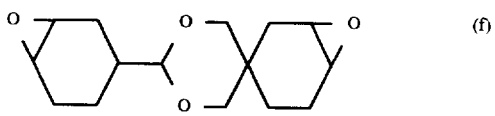

The dicyclohexyl oxide carboxylates represented by the general formula:

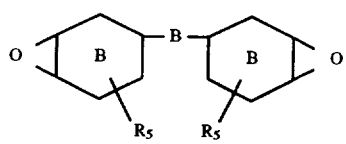

wherein $R_5$, in each instance represents from 0 to 3 lower alkyl groups, and B represents a divalent radical selected from the class consisting of 3,4-epoxycyclohexylmethyl 3,4-epoxycyclohexane-carboxylate.
3,4-epoxy-6-methylcyclohexylmethyl 3,4.epoxy-6-methylcyclohexylcarboxylate.
bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis (3,4-epoxy-6-methylcyclohexanecarboxylate)
and the like.

The term "lower alkyl" is used throughout this specification and claims as meaning alkyl containing from 1 to 6 carbon atoms such as methyl, ethyl, propyl, butyl, pentyl, hexyl and isomeric forms thereof. The term "lower alkylene" means alkylene containing from 1 to 6 carbon atoms such as methylene, ethylene, 1,3-propylene, 1,4-butylene, 2,3-butylene, 1,6-hexylene and the like. The term "lowercycloalkyl" means cycloalkyl from 4 to 8 carbon atoms such as cyclobutyl, cyclopentyl, cyclohexyl, cycloheptyl and cyclooctyl. The term "lower oxyalkylene" means lower alkylene as defined above, interrupted by the radical —O—. The term "arylene" means a bivalent radical, such as phenylene, tolylene, xylylene, biphenylylene and the like, derived from an aromatic hydrocarbon by removal of a hydrogen atom from each of two carbon atoms of the nucleus. The term "aryl" means the moiety obtained by removing one hydrogen atom from an aromatic hydrogen of from 6 to 12 carbon atoms, inclusive. Illustrative of aryl moieties are phenyl, tolyl, xylyl, biphenylyl, naphthyl and the like. The monomeric epoxides described and exemplified hereinabove are, for the most part, well known in the art; see for example. Lee and Neville. "Epoxy Resins." McGraw-Hill Book Company, New York (1957), U.S. Pat. Nos. 2,633,458, 2,716,123; 2,745,847; 2,745,285; 2,872, 427; 2,902,518; 2,884,408; 3,268,619; 3,325,452 and British Patent 614,235.

The proportion of potassium diphenylsulfone sulfonate employed in the blends of the invention following acid removal may be within the range of from about 0.01 to about 0.1 phr.

A drip-inhibiting proportion of PTFE is from about 0.001 to 0.5 phr.

A flame retarding proportion of the additive mixture is generally within the range of from 0.1 to 20.0 weight percent of the total composition.

The flame retarding additive can be added to the polyestercarbonate resin by conventional mixing technique. Thus, the production of the blend compositions of the invention is done by any of the blending operations known for the blending of thermoplastics. For example blending in a kneading machine such as a Banbury mixer or an extruder. The sequence of addition is not critical but all components should be thoroughly blended together. Blending can be done continuously or batchwise. Melt blending can also be employed.

Other flame retardants that may be used may include, but are not limited to, other sulfonated salts such as sodium trichloro benzene sulfonate, silicon-based materials such as hexaphenyl disiloxane, boron-containing materials such as triphenyl borate, red phosphorus or other phosphorus-containing compounds including the phosphates and phosphonates, sulfur containing compounds such as aromatic sulfimide, and nitrogen containing compounds such as cyanuric acid. Other brominated compositions such as commercially available Pyronil 45 (Pennwalt) and any of the Thermoguard series (M&T/Makhteshim) can be used in place of TB-50. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

The following examples describe the manner and process of making and using the invention and set forth the best mode contemplated by the inventor for carrying out the invention but are not to be construed as limiting the scope of the invention. All parts are by weight. Test results where reported are in accordance with the following test methods.

Glass Transition Temperature (Tg) was determined by differential scanning calorimetry (DSC) using a DuPont 900 thermal analyzer and is reported as ° C.

Molecular Weight ($M_w$)

The weight average molecular weight ($M_w$) was determined by gel permeation chromatography (GPC) in methylene chloride relative to polycarbonate standards using a UV detector at 254 nm.

Flammability (UL-94)

The resin is injection molded at about 600° C. into test bars of about 12.7 cm. by 1.27 cm. by 1.175 mm. in thickness. These test bars are subjected to the test procedure set forth in underwriters' Laboratories, Inc. Bulletin UL-94, Burning Test for Classified Materials. The test results are reported as V-0, V-1 or V-2 ratings based on the results of 5 test bar specimens. The criteria for each V (for vertical) rating per UL-94 is briefly as follows: "V-0": Average flaming and/or glowing after removal of the igniting flame shall not exceed 5 seconds and none of the specimens shall drip flaming particles which ignite absorbent cotton. "V-1": Average flaming and/or glowing after removal of igniting flame shall not exceed 25 seconds and the glowing does not travel vertically for more than 125 mm of the specimen after flaming ceases and glowing is incapable of igniting absorbent cotton. "V-2": Average flaming and/or glowing after removal of igniting flame shall not exceed 25 seconds and the specimens drip flaming particles which ignite absorbent cotton. Further, UL-94 requires that all test bars in each test group must meet the V-type rating to achieve the particular V classification. Otherwise, the 5 test bars receive the rating of the worst single bar. For example, if one bar is classified as V-2 and the other four are classified as V-0, then the rating for all 5 bars is V-2.

PREPARATION 1

Polyestercarbonate (PEC)

A mixture of 2.27 kg (9.96 moles) of bisphenol A (BPA), 6.8 liters of methylene chloride, 3.1 liters of water, 221.3 g (0.96 mole) of dodecanedioic acid (DDDA) sodium salt predissolved in 2.2 liters of water and 150 mt (2.85 moles) sodium hydroxide (50 wt %) and 0.5 mt (5 mmol.) triethylamine was charged to a 35-liter glass reactor and the pH was adjusted to 8.0 by the addition of 50% aqueous sodium hydroxide solution. The mixture was stirred.

Phosgene was introduced into the reaction mixture over a period of 43 minutes to a total of 1720 grams while the pH was maintained at 8.2–8.5, followed by the addition of 127.15 grams (0.06 mol) of p-cumylphenol as a solution in 1.0 liter of methylene chloride. The pH was raised to 10.5 by the addition of further base. Triethylamine, 28 ml (0.20 moles), was added and stirring was continued for 15 minutes. An additional 80 grams of phosgene was added to ensure complete polymerization. The organic layer was separated and washed twice with aqueous hydrochloric acid and five times with water, after which the product polymer was isolated by steam precipitation and dried. The polymer product was found to have a weight average molecular weight of 33,925 and a glass transition temperature (Tg) of 127° C.

The rheological behavior and reduced glass transition temperatures of these resins have use in injection molding. An example of such an application is in molded computer and business equipment housings. These parts require materials with reduced viscosities at shear rates experienced during mold filling in the injection molding process.

EXAMPLES 1–4

Compositions of the invention are prepared by blending together various proportions of a copolyestercarbonate resin from Preparation 1 supra., and various proportions of a flame-retarding additive consisting of 0.25 phr of TB-50 (tetrabromobisphenol-A/bisphenol-A; 50:50 oligomeric copolycarbonate, a flame retardant polymeric additive made by General Electric Co., Mount Vernon, Indiana), 0.12 phr of drip inhibitor concentrate (20% polytetrafluoroethylene mixed with 80% by weight of polycarbonate resin) and 0.2 phr of potassium diphenyl sulfone-3-sulfonate fire retardant (prepared as in U.S. Pat. N0. 3,948,851 and treated with 3,4-epoxycyclohexylmethyl-3,4-epoxycyclohexanecarboxylate (ERL-4221, Union Carbide Corp. New York, N.Y.) to remove contaminant acids.

The blend is fed to an extruder at a temperature of about 340° C. to extrude the blend into strands. The strands are chopped into pellets and injection molded into test sample measuring 6.35 cm×1.27 cm×0.317 cm. The samples are tested for physical properties. The composition formulation together with test results are set forth in the Table I, below

TABLE I

| | Example No. | | | | |
|---|---|---|---|---|---|
| | 1 | 2 | 3 | 4 | 5 (Control) |
| Ingredients (% by wgt.) | | | | | |
| PEC | 84.5 | 84.0 | 83.5 | 83.0 | 83.0 |
| Glass (Chopped) | 9.0 | 9.0 | 9.0 | 9.0 | 9.0 |
| B-56 Impact Modifier | 0.5 | 1.0 | 0.5 | 1.0 | 2.0 |
| Fire Retardant Additive | 6.0 | 6.0 | 7.0 | 7.0 | 0 |
| Test Results UL94 | | | | | |
| V Rating (125 mils) | V0 | V0 | V0 | V0 | burns |
| V Rating (60 mils) | V2 | V2 | — | — | burns |

What is claimed is:

1. A moldable thermoplastic blend of a copolyestercarbonate having a polymer backbone made up of recurring carbonate structural units of the formula:

wherein D is a divalent aromatic radical residue of the dihydric phenol employed in the preparative polymerization reaction; and repeating or recurring carboxylic chain units of the formula:

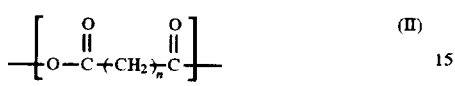

wherein n is a whole number integer of from 0 to 36; and
a fire-retarding proportion of a mixture of:
(i) a halogenated polycarbonate resin;
(ii) substantially acid free potassium diphenylsulfone sulfonate; and
(iii) a drip-inhibiting proportion of polytetrafluoroethylene.

2. A blend of a copolyestercarbonate having a polymer backbone made up of recurring carbonate structural units of the formula:

wherein D is a divalent aromatic radical residue of the dihydric phenol employed in the preparative polymerization reaction; and repeating or recurring carboxylic chain units of the formula:

wherein n is a whole number integer of from 0 to 36; and
a fire-retarding proportion of a mixture of tetrabromobisphenol-A, substantially acid free potassium diphenylsulfone sulfonate; and polytetrafluoroethylene.

3. The blend of claim 1, wherein the potassium diphenylsulfone sulfonate is substantially acid free potassium diphenylsulfone sulfonate, wherein said acid free potassium diphenylsulfone sulfonate is produced by pretreating contaminated potassium diphenylsulfone sulfonate which comprises an acid, with an epoxy compound to remove the acid from the potassium diphenylsulfone sulfonate.

4. The blend of claim 3, wherein the contaminated potassium diphenylsulfone sulfonate is treated with from 0.01 to 1.5 epoxy equivalents of an epoxy compound per equivalent of acid removed from said contaminated potassium diphenylsulfone sulfonate.

5. The polyestercarbonate blend of claim 2 wherein D represents the divalent radical of formula:

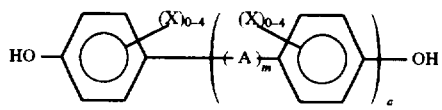

wherein A is a divalent hydrocarbon radical containing from 1 to about 15 carbon atoms; or a substituted divalent hydrocarbon radical containing from 1 to about 15 carbon atoms and substituent groups;

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

6. The blend of claim 5 wherein A represents propylene, X is hydrogen, m is 1 and a is 1.

7. The blend of claim 1 wherein n is 8.

8. The blend of claim 1 wherein n is 10.

9. The blend of claim 1 wherein the fire-retarding proportion is within the range of 0.1 to 20 weight percent of the total blend.

10. The blend of claim 1 wherein the drip-inhibiting proportion is within the range of from 0.001 to 0.5 per hundred resin.

11. The blend of claim 1 wherein the halogenated polycarbonate is one prepared from 50 percent bisphenol A units and 50 percent tetrabromobisphenol A on a molar basis.

* * * * *